(12) United States Patent
Lunghard et al.

(10) Patent No.: US 9,780,586 B2
(45) Date of Patent: Oct. 3, 2017

(54) DEVICE AND METHOD FOR CHARGING AN ELECTRIC ENERGY STORE FROM A THREE-PHASE AC VOLTAGE SOURCE

(71) Applicant: Robert Bosch GmbH, Stutgart (DE)

(72) Inventors: Karlheinz Lunghard, Buehl (DE);
Bertram Schillinger, Buehl (DE);
Heinz Waeldele, Offendorf (FR)

(73) Assignee: Robert Bosch GmbH, Stuttgart (DE)

( * ) Notice: Subject to any disclaimer, the term of this patent is extended or adjusted under 35 U.S.C. 154(b) by 96 days.

(21) Appl. No.: 14/434,123

(22) PCT Filed: Sep. 9, 2013

(86) PCT No.: PCT/EP2013/068587
§ 371 (c)(1),
(2) Date: Apr. 8, 2015

(87) PCT Pub. No.: WO2014/056664
PCT Pub. Date: Apr. 17, 2014

(65) Prior Publication Data
US 2015/0280474 A1    Oct. 1, 2015

(30) Foreign Application Priority Data
Oct. 11, 2012  (DE) .......................... 10 2012 218 512

(51) Int. Cl.
*H02J 7/00* (2006.01)
*H02M 7/04* (2006.01)
(Continued)

(52) U.S. Cl.
CPC ......... *H02J 7/0052* (2013.01); *B60L 11/1812* (2013.01); *B60L 11/1814* (2013.01);
(Continued)

(58) Field of Classification Search
CPC ..................................................... H02J 7/0052
(Continued)

(56) References Cited

U.S. PATENT DOCUMENTS

| 5,646,832 | A | 7/1997 | Pulhamus, Jr. et al. |
| 9,000,717 | B2* | 4/2015 | Januschevski ...... B60L 11/1803 320/104 |

(Continued)

FOREIGN PATENT DOCUMENTS

| CN | 101383555 A | 3/2009 |
| DE | 19523576 | 2/1996 |

(Continued)

OTHER PUBLICATIONS

International Search Report for Application No. PCT/EP2013/068587 dated Nov. 6, 2013 (English Translation, 2 pages).

*Primary Examiner* — M'Baye Diao
(74) *Attorney, Agent, or Firm* — Michael Best & Friedrich LLP

(57) ABSTRACT

The invention relates to a device (100) for charging an electric energy store (B) from a three-phase AC voltage source (W1, W2, W3), having, in each phase of the AC voltage source (W1, W2, W3):—a step-down converter (TS1 . . . TS3) with a switch (STS1 . . . STS3);—a diode (FLD) connected in parallel to the step-down converter (TS1 . . . TS3); and—a converter (U) which is connected to the step-down converter (TS1 . . . TS3) and which comprises at least one first half bridge (H1) with two serially connected switches (S1, S2), an inductor (L4) being connected between a connection point of the two switches (S1, S2) of the first half bridge (H1) and the step-down converter (TS1 . . . TS3);—wherein a current direction across the inductor (L4) is set by means of a rectifier (D11 . . . D33) in the step-down converter (TS1 . . . TS3); and—the switches (STS1 . . . STS3) of the step-down converter (TS1 . . . TS3) and at least (Continued)

one second switch (S2) of the first half bridge (H1) of the converter (U) can be switched by means of a controller (10) dependent on the voltages of the AC voltage source (W1, W2, W3) and a current flowing through the inductor (L4) such that a current drawn from the AC voltage source (W1, W2, W3) in order to charge the electric energy store (B) can be generated in such a manner that a substantially sinusoidal current is drawn from each phase of the AC voltage source (W1, W2, W3), the current and the corresponding voltage of the AC voltage source (W1, W2, W3) being substantially in phase in each said phase.

8 Claims, 3 Drawing Sheets

(51) Int. Cl.
  *B60L 11/18* (2006.01)
  *H02M 1/42* (2007.01)
  *H02M 7/217* (2006.01)

(52) U.S. Cl.
  CPC ......... *H02M 1/4216* (2013.01); *H02M 7/217* (2013.01); *B60L 2210/00* (2013.01); *H02M 2001/4291* (2013.01); *Y02T 10/7005* (2013.01); *Y02T 10/7072* (2013.01); *Y02T 90/127* (2013.01); *Y02T 90/14* (2013.01)

(58) Field of Classification Search
  USPC .............................................. 320/107; 363/84
  See application file for complete search history.

(56) References Cited

U.S. PATENT DOCUMENTS

| | | | |
|---|---|---|---|
| 2002/0149953 A1* | 10/2002 | Smedley | H02J 3/01 363/84 |
| 2007/0096696 A1* | 5/2007 | Lefley | H01M 6/5088 320/141 |
| 2007/0247091 A1* | 10/2007 | Maiocchi | H02M 3/156 318/400.04 |
| 2010/0096926 A1 | 4/2010 | King et al. | |
| 2015/0180344 A1* | 6/2015 | Lunghard | H02M 3/33507 363/17 |

FOREIGN PATENT DOCUMENTS

| | | |
|---|---|---|
| EP | 2500211 | 9/2012 |
| WO | 2007115384 | 10/2007 |
| WO | 2010103063 | 9/2010 |

* cited by examiner

DEVICE AND METHOD FOR CHARGING AN ELECTRIC ENERGY STORE FROM A THREE-PHASE AC VOLTAGE SOURCE

BACKGROUND OF THE INVENTION

The invention relates to an apparatus for charging an electrical energy store from a three-phase AC voltage source. The invention also relates to a method for charging an electrical energy store from a three-phase AC voltage source.

A known apparatus for the three-phase charging of a battery comprises a boost converter and a buck converter, which are provided to match voltage levels and are designed in each case as separate units. In addition, the known apparatus comprises a grid filter which is provided to suppress disturbing influences of the boost or buck converter on the three-phase AC voltage grid.

DE 195 235 76 A1 describes an AC voltage-DC voltage power supply unit and a method for converting an AC voltage into a DC voltage in high-voltage systems. The AC voltage-DC voltage power supply unit described in that document comprises a semiconductor switch which has a lower breakdown voltage on a low-voltage side of the flyback converter than a semiconductor switch on a high-voltage side. The lower breakdown voltage can be achieved by means of a shunt regulator which regulates a clamping voltage on the low-voltage switch side.

SUMMARY OF THE INVENTION

According to a first aspect, the invention provides an apparatus for charging an electrical energy store from a three-phase AC voltage source having in each phase of the AC voltage source:
- a buck converter device having a switch;
- a diode connected in parallel with the buck converter device;
- a converter device connected to the buck converter device, said converter device having at least one first half-bridge with two switches connected in series, wherein an inductance is connected between a node of the two switches of the first half-bridge and the buck converter device;
- wherein a charging current direction across the inductance is set by means of a rectifier device of the buck converter device;
- wherein the switches of the buck converter device and at least one second switch of the first half-bridge of the converter device can be switched by means of a controller on the basis of the voltages of the AC voltage source and of the charging current through the inductance such that a current drawn from the AC voltage source to charge the electrical energy store can be generated such that a substantially sinusoidal current is drawn from each phase of the AC voltage source, wherein, in each phase, the current and the voltage of the AC voltage source are substantially in phase.

According to a second aspect, the invention provides a method for charging an electrical energy store from an AC voltage source, which method has the following steps:
- stepping down each voltage phase of the AC input voltage such that a voltage level of the AC input voltage is lower than a defined voltage level of switches of a converter device; and
- generating a back emf for each stepped-down voltage phase such that the phase voltages of the AC voltage source and the currents which are drawn from each phase of the AC voltage source for charging the electrical energy store are substantially in phase.

A preferred embodiment of the apparatus is characterized in that either the second switch of the first half-bridge or the second switch of the second half-bridge or the second switch of the third half-bridge is switched. As a result, a selection of different switches of the converter device is advantageously made possible, wherein the selection can also be changed according to requirements.

Another preferred embodiment of the apparatus according to the invention is distinguished in that the second switch of the first half-bridge and the second switch of the second half-bridge and the second switch of the third half-bridge are switched in an interleaved manner. As a result, a switching capacity is advantageously divided between the switches of the converter device, which causes an equal loading of the switches of the converter device.

Another preferred embodiment of the apparatus according to the invention is characterized in that in each case one phase winding of a three-phase electric motor is connected to in each case one node of the switches of a half-bridge of the converter device, wherein a neutral point of windings of the electric motor is connected to an output of the buck converter device. As a result, winding inductances of an electric motor are advantageously used, which advantageously makes the use of an external inductance obsolete.

Another preferred embodiment of the apparatus according to the invention is distinguished in that the second switches of two or three half-bridges of the converter device are switched synchronously or in an interleaved manner. Owing to the interleaved switching process, this advantageously causes a reduced ripple in the charging current for the electrical energy store. Through the synchronous switching of the switches, it is possible to achieve homogenization of switching capacity on the switches of the converter device.

A preferred embodiment of the apparatus according to the invention is characterized in that exclusively the switches of the buck converter device are switched. This permits a minimized tapping arrangement for the event that the electric grid voltage is greater than the electric voltage of the electrical energy store.

It is considered to be particularly advantageous in the case of the invention that it is possible by means of the converter device and the buck converter device to bring about an efficient and cost-effective three-phase charging of an electrical energy store by the converter device and the buck converter device controlling a charging current for the electrical energy store.

In this case, it is also considered to be an advantage in particular that a converter device (for example a B6 inverter in a drive system with a high-voltage battery for electric vehicles) which is already present in a system can be employed for the charging function of the electrical energy store. In this way, the buck converter device together with coupling inductances realizes a correction functionality in the sense of power factor correction, which is a requirement for compliance with EN power supply standards.

It is also considered to be particularly advantageous that, owing to the use of the buck converter device and the converter device as a boost converter, the principle according to the invention can be used in a broad input and battery voltage range. In this way, a charging concept which can be used universally is realized.

BRIEF DESCRIPTION OF THE DRAWINGS

Further features and advantages of the present invention are explained below on the basis of embodiments with reference to the figures. In this case, all features described or illustrated form the subject matter of the invention by themselves or in any desired combination, independently of their summary in the patent claims or the dependency reference thereof, and independently of their wording or illustration in the description or in the figures. The figures are primarily intended to elucidate the principles essential to the invention, and are not necessarily to be understood as detailed circuit diagrams. In the figures, identical reference signs designate identical or functionally identical elements.

In the figures.

DETAILED DESCRIPTION

Figure 1:
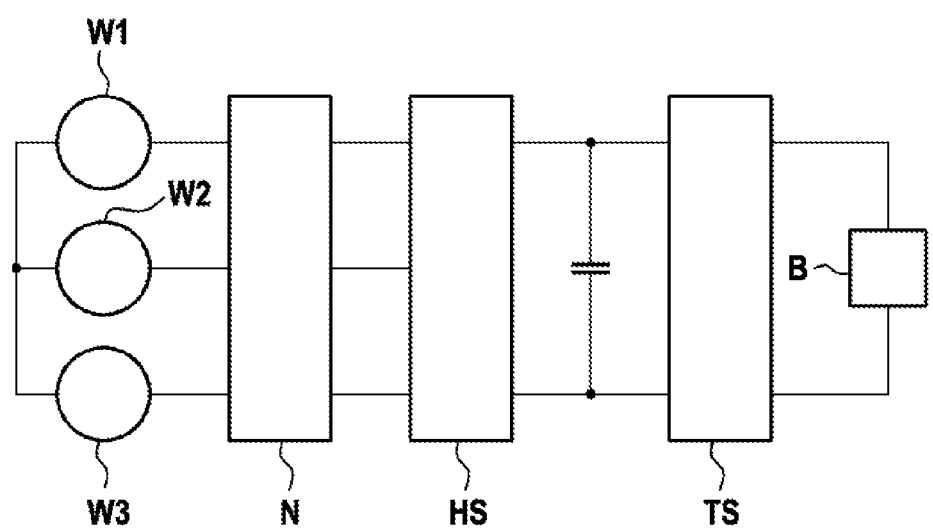
FIG. 1 shows a conventional apparatus for the three-phase charging of an electrical energy store.

FIG. 1 shows a conventional apparatus for the three-phase charging of an electrical energy store B. A three-phase AC input voltage W1, W2, W3 (three-phase current) is rectified by means of a boost converter HS and raised to a higher intermediate circuit voltage level. The DC intermediate circuit voltage is smoothed by means of an intermediate circuit capacitor. The voltage level of the intermediate circuit voltage is reduced according to charging requirements of the electrical energy store B by means of a buck converter TS. A grid filter N arranged between the three-phase AC voltage W1, W2, W3 and the boost converter HS prevents harmonic limits according to legal standards and regulations from being exceeded.

According to the invention, provision is now made to use a converter device U which is already present in a system for the three-phase charging of the electrical energy store B.

Figure 2:
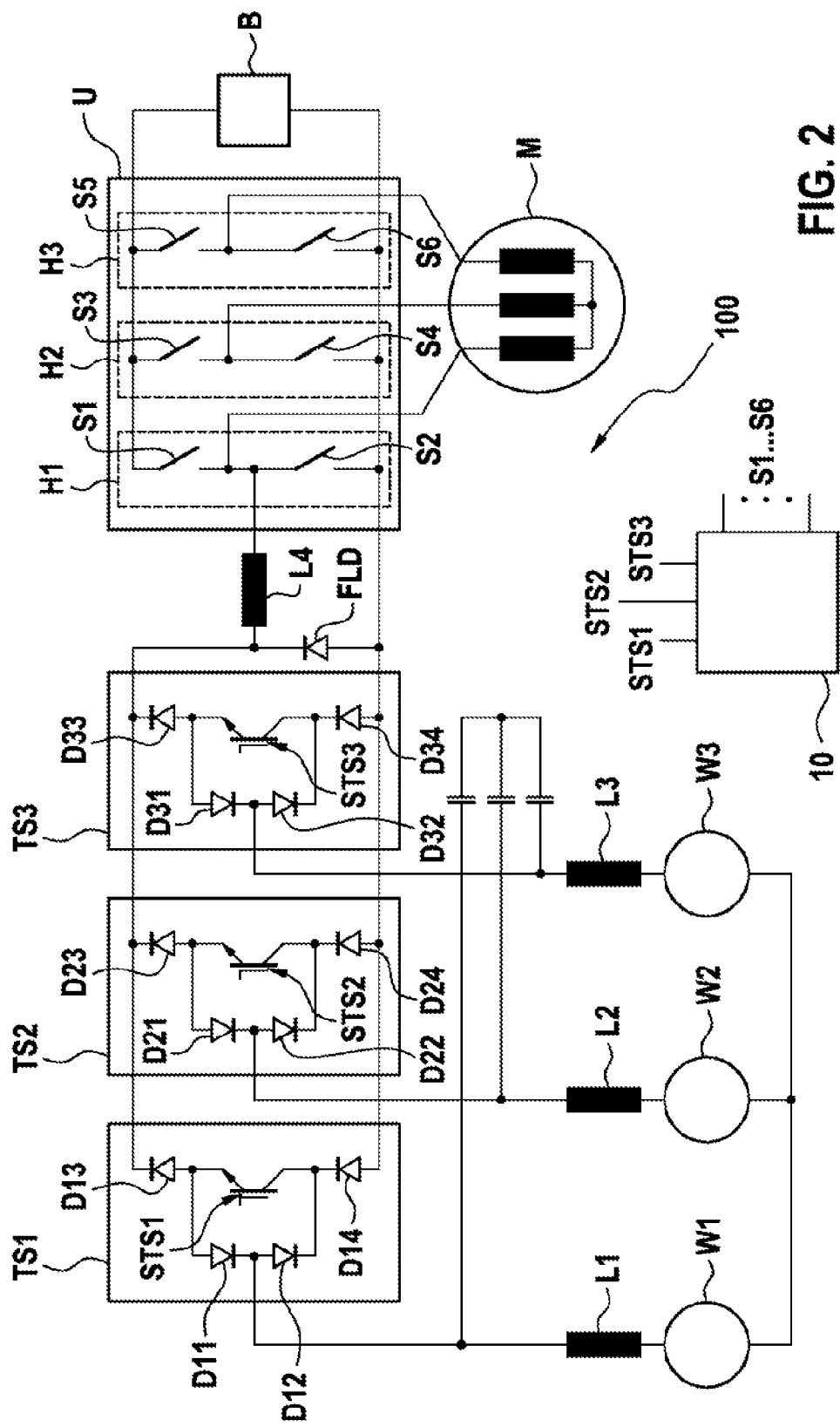
FIG. 2 shows a first embodiment of the apparatus according to the invention.

FIG. 2 shows a first embodiment of the apparatus 100 according to the invention. A buck converter device TS1, TS2, TS3 is connected to each phase voltage W1, W2, W3 of the three-phase AC input voltage, each of which buck converter devices has a power semiconductor switch (for example IGBT) STS1, STS2, STS3 and a rectifier device in the form of four diodes D11 . . . D33. In each case one diode D13, D14, D23, D24, D33, D34 is electrically connected to an emitter and a collector of the switch STS1, STS2, STS3. In addition, two series-connected diodes D11, D12, D21, D22, D31, D32 form a series connection which is electrically interconnected in each case via a gate of the switch STS1, STS2, STS3.

In this case, said diodes D11 . . . D33 of the rectifier device undertake essentially the setting of a current direction of phase currents, which are to flow in a uniform direction via a coupling inductance L4 for charging the electrical energy store B.

A coupling inductance L1, L2, L3 is connected to each of the three phase voltages W1, W2, W3 at a node of the two diodes D11, D12, D21, D22, D31, D32 connected in parallel with the gate of the switches STS1, STS2, STS3.

An output of the buck converter device TS1, TS2, TS3 is connected to a converter device U (for example a B6 inverter) having three half-bridges H1, H2, H3 with in each case two series-connected switches S1 . . . S6, wherein a further inductance L4 is connected between a node of the first half-bridge H1 and the output of the buck converter device TS1, TS2, TS3. An electric motor M is connected at nodes of the switches of the half-bridges of the converter device U, wherein the electric motor M has no function in this configuration.

Values, which are detected by means of current and voltage sensors (not shown), and temporal profiles of the three phase voltages, phase currents and a summation current through the inductance L4 (battery charging current) are supplied to an electronic controller 10.

On the basis of the temporal profiles of the three phase voltages, the phase currents and the summation current through the inductance L4, the switches STS1, STS2, STS3 of the buck converter device TS1, TS2, TS3 are now switched by means of the controller 10 such that the three phase currents are in phase with the respective phase voltages W1, W2, W3. In addition, a summation charging current, which does not exceed a defined maximum value, for the electrical energy store B is generated by means of the switches STS1, STS2, STS3 of the buck converter device TS1, TS2, TS3. Flows of current via the inductances L1 . . . L3 are interrupted by the switching of the switches of the buck converter device, for which reason a freewheeling diode FLD, which enables a flow of current via the inductance L4 at defined switch phases of the switches STS1, STS2, STS3, is provided. Advantageously, the switches STS1, STS2, STS3 of the buck converter device TS1, TS2, TS3 are symmetrically loaded by the explained operating method.

The converter device U which is connected downstream functionally implements a boost converter topology, wherein an electric back emf is built up downstream of the inductance L4 to an electric voltage upstream of the inductance L4 by means of clocked operation of the second switch S2 of the first half-bridge H1, said electric back emf driving a charging current for the electrical energy store B via a freewheeling diode (not illustrated) connected in parallel with the switch S1.

The semiconductor switches S1 . . . S6 of the converter device U can only be loaded to a voltage of approximately 600 V for design reasons. For this reason, the electric voltage must be appropriately provided for the switches S1 . . . S6 by means of the buck converter device TS1, TS2, TS3.

Ultimately, this means providing an ohmic performance in the three phases W1, W2, W3 of the three-phase AC voltage source, which advantageously involves low harmonic emissions into the three-phase AC voltage grid. In this way, therefore, a current profile which is synchronous to each grid voltage is provided.

In this way, according to the invention, the buck converter device TS1, TS2, TS3 together with the inductances L1 . . . L4 realizes a functionality of a correction device according to the principles of power factor correction.

By way of example, it is conceivable for only one second switch S2, S4, S6 of one of the three half-bridges H1, H2, H3 to be switched.

It is also conceivable for the second switches S2, S4, S6 of the half-bridges H1, H2, H3 to be switched in an interleaved manner, as a result of which a ripple in the total charging current is advantageously significantly reduced. In addition, this advantageously results in the individual switches S1 . . . S6 of the converter device U being loaded less heavily because the electric switching capacity is equally distributed on the switches S1 . . . S6.

Figures 3, 4:
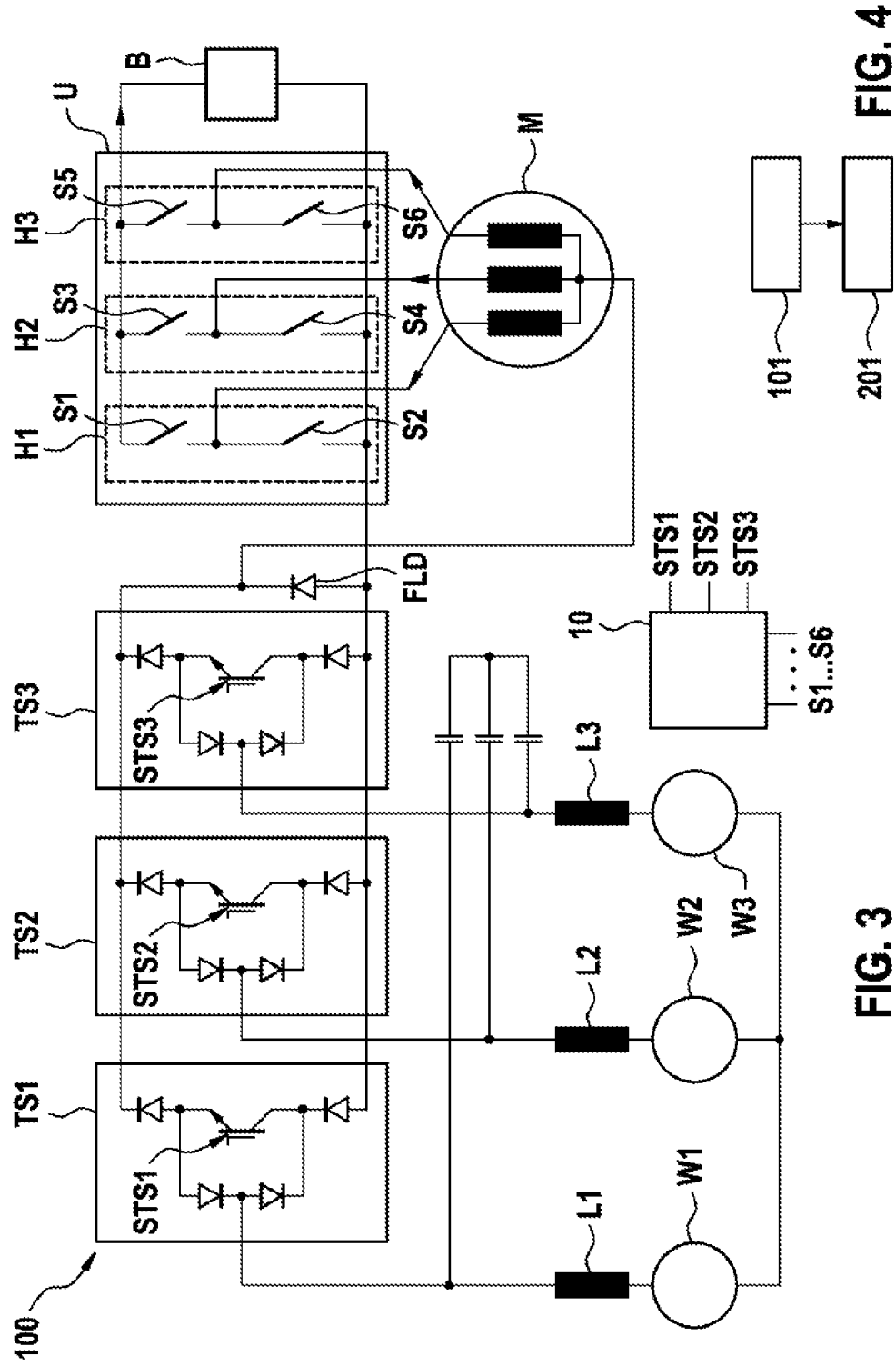
FIG. 3 shows another embodiment of the apparatus according to the invention.
FIG. 4 shows a basic illustration of a flow chart of an embodiment of the method according to the invention.

FIG. 3 illustrates a variant of the apparatus 100 according to the invention, in which variant winding inductances of the electric motor M are used as inductance L4. A neutral point tap is provided for the electric motor M, wherein a neutral point is connected to an output of the buck converter device TS1, TS2, TS3. In this case, it is possible for one or two or all three half-bridge(s) H1, H2, H3 of the converter device U to be used, depending on requirements.

It is also possible in the embodiment of the apparatus 100 from FIG. 3 to switch the switches of the half-bridges H1, H2, H3 in an interleaved manner, with the result that the switching capacity is homogenized or a "temperature travel" of the individual switches of the half-bridges H1, H2, H3 is reduced. This has advantageous effects in the form of a lengthened service life of the switches.

FIG. 4 shows a basic flow chart of an embodiment of the method according to the invention. In a first step 101, each voltage phase of the AC input voltage is stepped down such that a voltage level of the AC input voltage is lower than a defined voltage level of switches of a converter device.

In a second step 201, a back emf for each stepped-down voltage phase is generated such that the phase voltages of the AC voltage source W1, W2, W3 and the currents which are drawn from each phase of the AC voltage source W1, W2, W3 for charging the electrical energy store B are substantially in phase.

It is advantageously possible by means of the apparatus and method according to the invention to configure the individual phase currents to be sinusoidal, which contributes to meeting given standards relating to harmonics.

Advantageously, no block-shaped currents, which occur in conventional systems and which entail a disadvantageous effect on harmonics and emissions, are generated by means of the invention.

Advantageously, no transformer is necessary for matching the input voltage in the apparatus according to the invention.

Although the present invention has been described with reference to preferred exemplary embodiments, it is not restricted thereto. A person skilled in the art will therefore be able to modify the described features of the invention or combine said features with one another without deviating from the core of the invention.

The invention claimed is:

1. An apparatus (100) for charging an electrical energy store (B) from a three-phase AC voltage source (W1, W2, W3) having in each phase of the AC voltage source (W1, W2, W3):
    a buck converter (TS1 . . . TS3) having a switch (STS1 . . . STS3);
    a diode (FLD) connected in parallel with the buck converter (TS1 . . . TS3);
    a converter (U) connected to the buck converter (TS1 . . . TS3), said converter having at least one first half-bridge (H1) with two switches (S1, S2) connected in series, wherein an inductance (L4) is connected between a node of the two switches (S1, S2) of the first half-bridge (H1) and the buck converter (TS1 . . . TS3);
    wherein a charging current direction across the inductance (L4) is set by a rectifier (D11 . . . D33) of the buck converter (TS1 . . . TS3);
    wherein the switches (STS1 . . . STS3) of the buck converter (TS1 . . . TS3) and at least one second switch (S2) of the first half-bridge (H1) of the converter (U) are switched by a controller (10) on the basis of voltages of the AC voltage source (W1, W2, W3) and of charging current through the inductance (L4) such that a current drawn from the AC voltage source (W1, W2, W3) to charge the electrical energy store (B) is generated such that a substantially sinusoidal current is drawn from each phase of the AC voltage source (W1, W2, W3), wherein, in each phase, the current and the voltage of the AC voltage source (W1, W2, W3) are substantially in phase.

2. The apparatus as claimed in claim 1, characterized in that either the second switch (S2) of the first half-bridge (H1) or the second switch (S4) of the second half-bridge (H2) or the second switch (S6) of the third half-bridge (H3) of the converter (U) is switched.

3. The apparatus as claimed in claim 1, characterized in that the second switch (S2) of the first half-bridge (H1) and the second switch (S4) of the second half-bridge (H2) and the second switch (S6) of the third half-bridge (H3) are switched in an interleaved manner.

4. The apparatus as claimed in claim 1, characterized in that in each case one phase winding of a three-phase electric motor (M) is connected to in each case one node of the switches (S1 . . . S6) of a half-bridge (H1, H2, H3) of the converter (U), wherein a neutral point of windings of the electric motor (M) is connected to an output of the buck converter (TS1, TS2, TS3).

5. The apparatus as claimed in claim 4, characterized in that the second switches (S2, S4, S6) of two or three half-bridges (H1, H2, H3) of the converter (U) are switched synchronously or in an interleaved manner.

6. The apparatus as claimed in claim 4, characterized in that exclusively the switches (STS1, STS2, STS3) of the buck converter (TS1, TS2, TS3) are switched.

7. A method for charging an electrical energy store (B) from a three-phase AC voltage source (W1, W2, W3), the method comprising:
    stepping down each voltage phase of an AC input voltage such that a voltage level of the AC input voltage is lower than a defined voltage level of switches of a converter (U); and
    generating a back electromotive force for each stepped-down voltage phase such that phase voltages of the AC voltage source (W1, W2, W3) and currents which are drawn from each phase of the AC voltage source (W1, W2, W3) for charging the electrical energy store (B) are substantially in phase.

8. A non-transitory computer readable medium including a computer program code stored thereon for performing the method as claimed in claim 7 when executed on an electronic controller (10).

* * * * *